(12) United States Patent
Dessart

(10) Patent No.: US 7,921,215 B2
(45) Date of Patent: Apr. 5, 2011

(54) METHOD AND APPARATUS FOR OPTIMIZING AND PRIORITIZING THE CREATION OF A LARGE NUMBER OF VPN TUNNELS

(75) Inventor: Francois Dessart, Gembloux (BE)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 12/319,885

(22) Filed: Jan. 12, 2009

(65) Prior Publication Data

US 2010/0180037 A1 Jul. 15, 2010

(51) Int. Cl.
*G06F 15/16* (2006.01)
(52) U.S. Cl. .................. 709/227; 709/224; 709/230
(58) Field of Classification Search .................. 709/227, 709/224, 230
See application file for complete search history.

(56) References Cited

U.S. PATENT DOCUMENTS

| 7,376,743 | B1 | 5/2008 | Bazzinotti et al. | |
|---|---|---|---|---|
| 7,644,171 | B2 * | 1/2010 | Sturniolo et al. | 709/230 |
| 2005/0055435 | A1 * | 3/2005 | Gbadegesin et al. | 709/224 |

OTHER PUBLICATIONS

C. Kaufman, "Internet Key Exchange (IKEv2) Protocol", RFC 4306, Dec. 2005.
"Call Admission Control for IKE", Cisco's IOS Release 12.3T, May 17, 2004.

* cited by examiner

*Primary Examiner* — Kyung-Hye Shin
(74) *Attorney, Agent, or Firm* — Abelman, Frayne & Schwab

(57) ABSTRACT

There is provided a communications network including a server forming part of a virtual private network, a plurality of client computers operative to request connection to the server and to be connected to the server when a request for connection is granted, thereby to be added to the virtual private network and a server response module, operative, in response to a connection request from at least one of the plurality of client computers which connection request cannot be processed by the server, to provide to the at least one of said plurality of client computers a server response indicating that the connection request should be retransmitted only after at least one criterion is met.

14 Claims, 3 Drawing Sheets

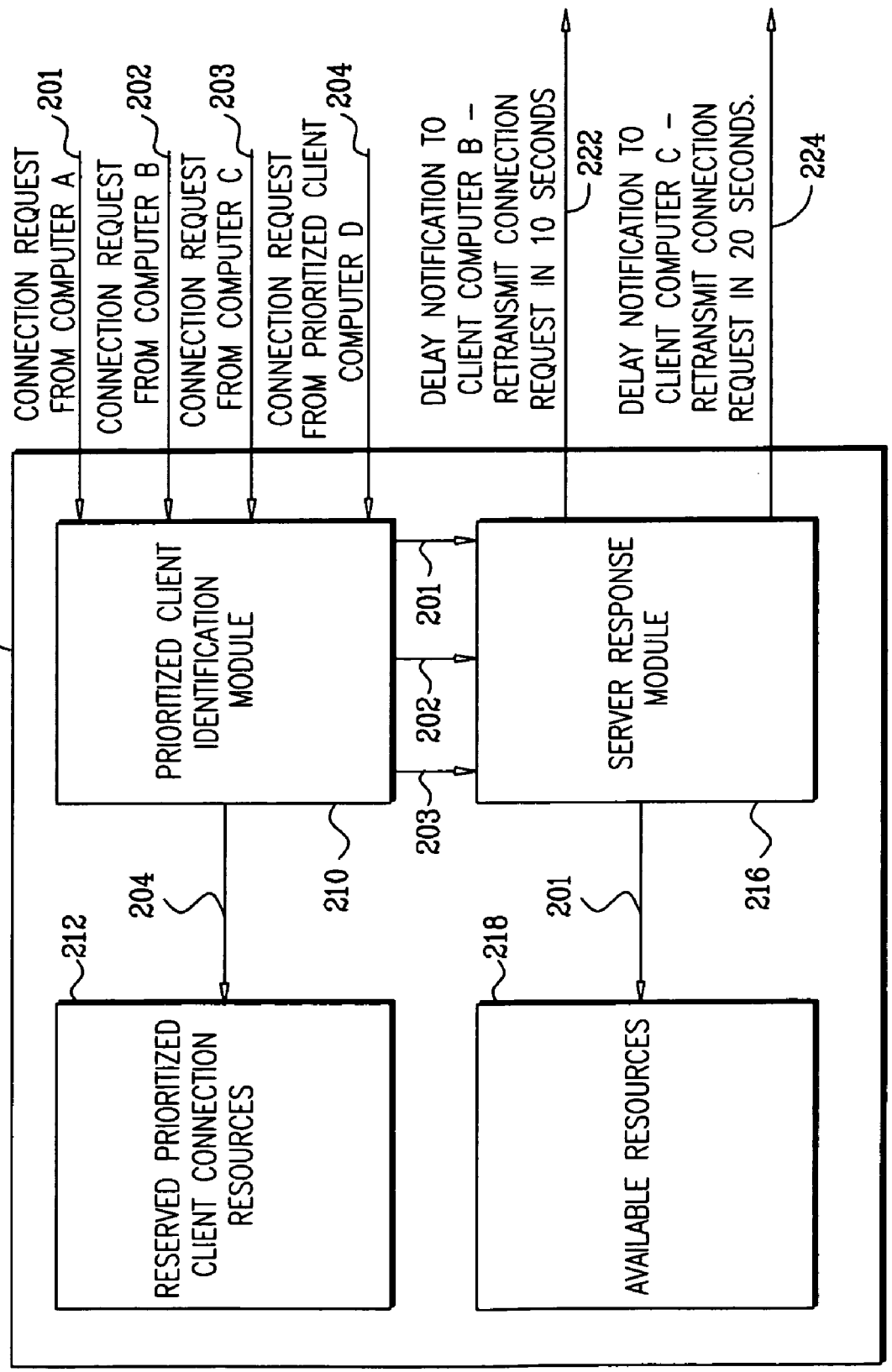

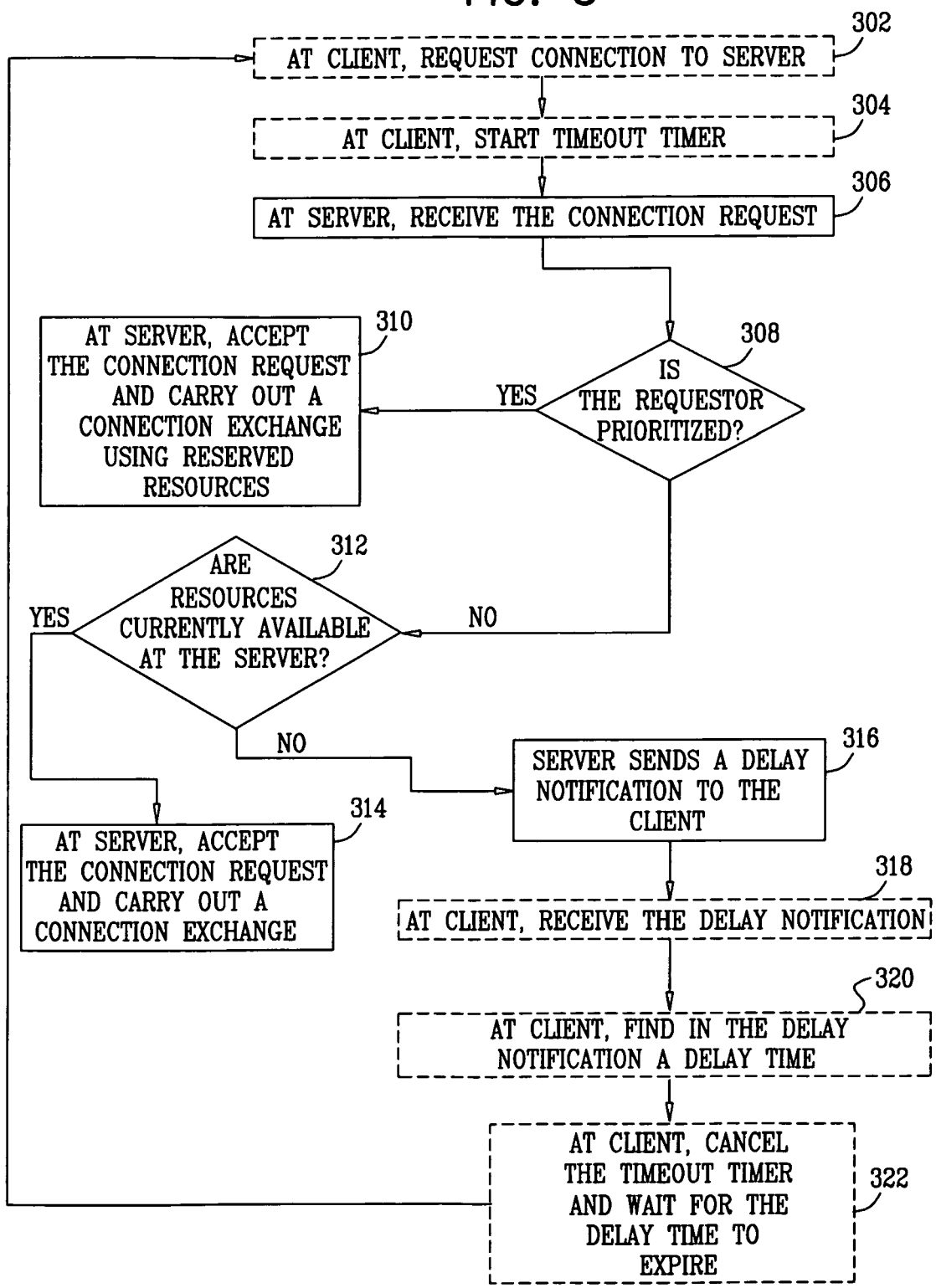

METHOD AND APPARATUS FOR OPTIMIZING AND PRIORITIZING THE CREATION OF A LARGE NUMBER OF VPN TUNNELS

FIELD OF THE INVENTION

The present invention relates generally to communication systems, and particularly to methods and systems for optimizing and prioritizing the creation of a large number of VPN tunnels.

BACKGROUND OF THE INVENTION

In the creation of Virtual Private Networks (VPNs), multiple tunnels connecting multiple client computers to a hub often have to be created in a short time period. This may occur following certain system failure scenarios, such as a power outage or a connectivity problem, which typically result in multiple devices simultaneously trying to reconnect to the hub. As the creation of VPN tunnels is computationally intensive, the hub cannot process all the connection requests.

Current methods for creation of tunnels connecting client computers to a Virtual Private Network are described, for example, in the RFC 4306 standard, entitled "Internet Key Exchange (IKEv2) Protocol", which is incorporated herein by reference. Section 1.2 of this standard describes the current initial exchange between the hub and a client computer requesting connection to the hub.

According to the RFC 4306 standard, when the hub cannot process a connection request, the client computer waits until a timeout duration expires, and retransmits the request. In the situation described above, this results in multiple client computers retransmitting connection requests to the hub and in delayed session creation, while maintaining a high traffic volume on the network.

One current solution to the problem described hereinabove is limiting the number of sessions the hub can create simultaneously. This allows necessary resources to be allocated to successfully respond to some of the connection requests. This solution is described, for example, in Cisco's IOS Software Release 12.3T, first published on May 17, 2004 and entitled "Call Admission Control for IKE", which is incorporated herein by reference.

One disadvantage of this solution is that the connection requests of all the client computers are given the same priority by the hub, and thus all client computers have the same probability for creation of a connection.

Additionally, under the solution described above, the most aggressive client computer, which retransmits the connection request most frequently, has the highest probability of connecting to the hub. Under ideal conditions, in which each client computer uses an exponentially increasing delay time for retransmission of the connection request, the time duration for establishing all the requested VPN tunnels is greatly increased.

Furthermore, the load on the network and on the device may stay high for a very long time, which may adversely affect the function of the device or of other applications using the network.

Applicant's U.S. Pat. No. 7,376,743, filed on Oct. 29, 2002 and entitled METHOD AND APPARATUS FOR LOAD BALANCING IN A VIRTUAL PRIVATE NETWORK", which is hereby incorporated by reference, describes a network including a plurality of hubs, one of which is designated as the master hub. All connection requests from client computers are directed to the master hub, which then responds to the requesting client computer with a redirection message, which indicates a specific hub to which the connection request should be resent.

The present invention will be more fully understood from the following detailed description of embodiments thereof, taken together with the drawings in which:

BRIEF DESCRIPTION OF THE DRAWINGS

FIG. 2 is a simplified block diagram illustrating the structure and functionality of a hub server, useful in the context of FIG. 1, which is constructed and operative in accordance with an embodiment of the present invention; and FIG. 3 is a simplified flowchart that schematically illustrates a method for creation of multiple VPN tunnels in response to multiple simultaneous connection requests, in accordance with an embodiment of the present invention.

DESCRIPTION OF AN EXAMPLE EMBODIMENT

Overview

Figure 1:
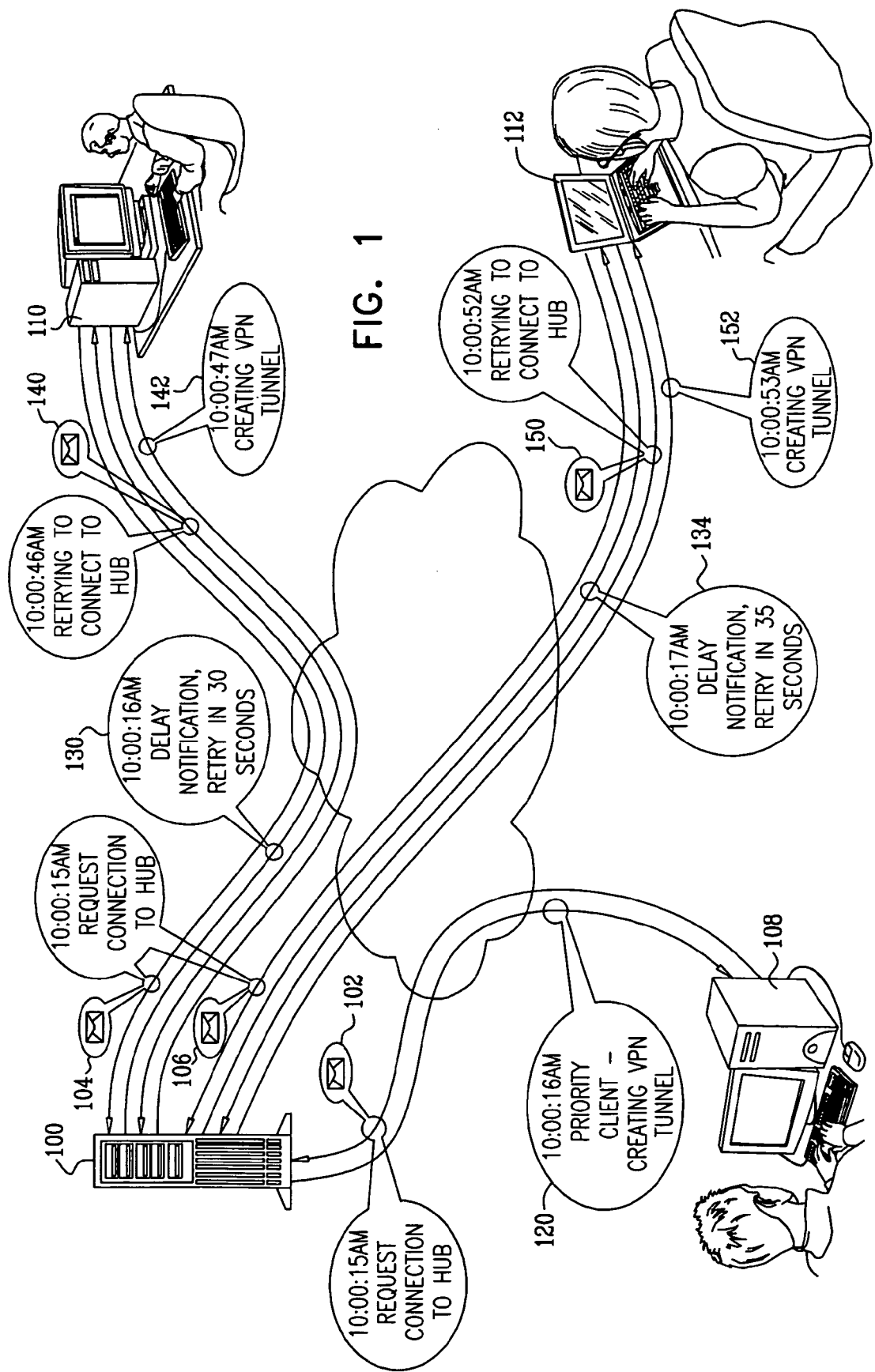
FIG. 1 is a simplified illustrative drawing illustrating creation of multiple VPN tunnels in response to multiple simultaneous connection requests, in accordance with an embodiment of the present invention.

Embodiments of the present invention provide improved methods and systems for creation of a large number VPN tunnels connecting multiple client computers to a hub, and for creating these VPN tunnels in a prioritized manner.

In some embodiments, when multiple client computers simultaneously request connection to a hub, and the hub cannot support all the requests and create all the VPN tunnels, the hub responds to some or all of the client computers indicating a delay time that they should wait prior to retransmitting the connection request. The responses sent by the hub are designed to ensure that the hub will be able to support all the connection requests transmitted at a given point in time, and that client computers do not wait longer than is necessary to retransmit the connection request, thereby resulting in a shorter time duration passing before all the requested sessions are created.

In other embodiments, the hub includes reserved client connection resources, which are used to immediately create a VPN tunnel connecting prioritized clients to the hub, thereby giving these clients higher connection priority. It is appreciated that this functionality is only possible when the number of sessions being created by the hub at any given time is controlled, thereby allowing the reservation of resources.

The methods and systems described herein can be used in various communication protocols and communication media, such as in Internet Key Exchange (IKE) Protocol versions 1 and 2, and in any device that supports one or more of these protocols.

System and Method Description

Reference is now made to FIG. 1, which is a simplified illustrative drawing illustrating creation of multiple VPN tunnels in response to multiple simultaneous connection requests, in accordance with an embodiment of the present invention.

As seen in FIG. 1, a hub server 100 simultaneously receives a plurality of connection requests 102, 104 and 106, from a plurality of client computers, illustrated as client computers 108, 110 and 112. It is appreciated that the server 100 cannot process connection requests 102, 104 and 106 at the time they are received using available resources.

The server 100 receives connection requests 102, 104 and 106, and identifies connection request 102 as being received from client computer 108 which is a prioritized client computer. The server 100 then employs reserved prioritized client connection resources (not shown) for immediately processing connection request 102 thereby creating a VPN tunnel between server 100 and client computer 108, as indicated by a client computer notification 120.

It is appreciated that the reserved prioritized client connection resources may be employed by the server 100 for processing multiple prioritized connection requests received from multiple prioritized client computers. Thus, server 100 may further include a mechanism for identifying the order of priority of the multiple prioritized connection requests, which mechanism is used for determining the order in which the multiple prioritized connection requests should be processed using the reserved prioritized client connection resources.

In response to connection requests 104 and 106, which were not transmitted from prioritized computers, the server 100 transmits to each of client computers 110 and 112 a delay notification, indicating a time duration that should be allowed to pass prior to retransmitting connection requests 104 and 106.

In the illustrated embodiment, the server 100 transmits a delay notification 130 indicating that client computer 110 should wait 30 seconds prior to retransmitting connection request 104, and a delay notification 134 indicating that client computer 112 should wait 35 seconds prior to retransmitting connection request 106.

As illustrated in FIG. 1, 30 seconds after receipt of delay notification 130 client computer 110 retries to connect to the hub by sending a retry connection request 140. At this point, the server 100 has available resources, and the connection request 140 is immediately processed by the server 100, thereby connecting client computer 110 to the server 100 via a VPN tunnel as indicated by a client computer notification 142.

In a similar manner, 35 seconds after receipt of delay notification 134 client computer 112 retries to connect to the hub by sending a retry connection request 150. At this point, the server 100 has available resources, and the connection request 150 is immediately processed by the server 100, thereby connecting client computer 112 to the server 100 via a VPN tunnel as indicated by client computer notification 152.

It is appreciated that the delay time indicated in the delay notification is typically calculated at the time of providing the delay notification, and may for example be based on the resources available on the server 100, the number of VPN tunnels already in creation, the number of connection requests seen by the server, or the expected number of connection requests. One example for the calculation of the delay time is:

$$\text{DELAY(SECONDS)} = \left( \frac{(\text{SCHEDULED} - \text{CREATED}) * \text{UNIT\_RESOURCES}}{\text{TOTAL\_RESOURCES}} \right)$$

where the following definitions apply:

SCHEDULED—the number of VPN tunnels scheduled to be created. This number is typically generated by checking the number of connection requests which have already been responded to with a delay notification;

CREATED—the number of VPN tunnels already created;

UNIT_RESOURCES—the amount of resources required for creating one tunnel; and

TOTAL_RESOURCES—the amount of resources available for VPN tunnel creation at a given time frame.

Reference is now made to FIG. 2, which is a simplified block diagram illustrating the structure and functionality of a hub server, useful in the context of FIG. 1, which is constructed and operative in accordance with an embodiment of the present invention.

As seen in FIG. 2, a plurality of connection requests 201, 202, 203 and 204 are transmitted to server 100, from client computers A, B, C and D, respectively. The plurality of connection requests 201, 202, 203 and 204 are received by a prioritized client identification module 210 forming part of server 100, which module is operative to identify those connection requests received from prioritized client computers. In the illustrated embodiment, the prioritized client identification module 210 identifies that connection request 204 was received from computer D which is a prioritized client computer.

It is appreciated that the prioritized client identification module 210 may also include a prioritized client order determining module (not shown), which is used for determining the order in which prioritized connection requests should be processed using the reserved prioritized client connection resources when multiple prioritized connection requests are transmitted to the server.

Prioritized client identification module 210 transfers connection request 204 to reserved prioritized client connection resources 212 for immediate processing, by which reserved prioritized client connection resources 212 immediately establish a VPN tunnel between the server 100 and the prioritized client computer D.

The prioritized client identification module 210 transfers connection requests 201, 202 and 203, which were not received from prioritized clients, to a server response module 216. Server response module 216 checks whether the server 100 has any available resources for processing non-prioritized connection requests. The server response module 216 then employs any such available resources, indicated by reference numeral 218 for processing as many connection requests as possible using the available resources. In the illustrated embodiment, the available resources 218 are sufficient for creation of a single VPN tunnel. Therefore, server response module 216 employs available resources 218 for creating a single VPN tunnel between the server 100 and client computer A, in response to connection request 201.

In response to connection requests 202 and 203, which cannot be processed using the available resources 218, the server response module 216 transmits to client computer B a delay notification 222 indicating that it should retransmit the connection request 202 after 10 seconds have passed, and transmits to client computer C a delay notification 224 indicating that it should retransmit the connection request 202 after 20 seconds have passed.

Reference is now made to FIG. 3, which is a simplified flowchart that schematically illustrates a method for creation of multiple VPN tunnels in response to multiple simultaneous connection requests, in accordance with an embodiment of the present invention.

As seen in FIG. 3, a client requests connection to a server, as seen at step 302, and starts a timeout timer, as seen at step 304. The server receives the connection request, as seen at step 306, and checks whether the connection request was transmitted from a prioritized client computer, as indicated at decision step 308.

If the connection request was transmitted by a prioritized client computer, the server accepts the connection request, and carries out a connection exchange, such as that defined by the IKEv2 protocol, using resources reserved for connection of prioritized client computers, as indicated at step 310.

Otherwise, if the connection request was not transmitted by a prioritized client computer, the server checks whether resources are currently available for creation of a connection with the requesting client computer, as seen at decision step 312.

If resources are available, the server accepts the connection request, and carries out a connection exchange, such as that defined by the IKEv2 protocol, using the available resources, as seen at step 314. Otherwise, if resources are not available, the server sends a delay notification to the client, as seen at step 316. The delay notification typically includes a delay time, but may include an indication of any other criterion which should be fulfilled prior to retransmission of the connection request. The delay notification may also include a cookie value, which could be used to determine whether a specific client has received more than one delay notification and whether the client should be considered a prioritized client.

As seen at step 318, the client receives the delay notification, and finds in the delay notification a delay time defined by the server, as seen at step 320. The client then cancels the timeout timer, and waits for the delay time to expire, as seen at step 322. Following the expiration of the delay time, the client retransmits the connection request, and once again requests connection to the server.

An embodiment of the present invention provides a computer program product comprising a non-transitory computer-readable medium containing computer instructions, which instructions, when read and executed by a computer, cause the computer to perform one or more methods of the present invention as described above.

It is appreciated that in accordance with the present invention, a VPN tunnel is normally created with each client computer following at most two transmissions of a connection request from that client computer to the server.

Additionally, using the system and method described hereinabove results in a short spike of traffic in the network, during the time of transmission of initial connection requests and delay notifications, which is followed by an immediate decrease in volume in the network, thereby minimizing the impact of the creation of a large number of VPN tunnels on other functionalities of the network.

It will be appreciated by persons skilled in the art that the present invention is not limited to what has been particularly shown and described hereinabove. Rather the scope of the present invention includes both combinations and subcombinations of various features described hereinabove as well as modifications of such features which would occur to a person of ordinary skill in the art upon reading the foregoing description and which are not in the prior art.

The invention claimed is:

1. A communications network comprising:
a server forming part of a virtual private network;
a plurality of client computers operative to request connection to said server and to be connected to said server when a request for connection is granted, thereby to be added to said virtual private network, wherein at least one of said plurality of client computers is a prioritized client computer having an order of priority; and
a server response module, operative, in response to a connection request from at least one of said plurality of client computers which connection request cannot be processed by said server, to provide to said at least one of said plurality of client computers:
a delay notification indicating that said connection request should be retransmitted by said at least one of said plurality of client computers after a specified time duration is allowed to pass, wherein said specified time duration depends on said order of priority.

2. A communications network according to claim 1 and wherein said server includes:
reserved prioritized client connection resources; and
a prioritized client identification module operative, upon receipt of a connection request from said prioritized client computer, to identify said connection request as a prioritized connection request and to employ said reserved prioritized client connection resources to connect said prioritized client computer to said server thereby to add said prioritized client computer to said virtual private network.

3. A communications network according to claim 1 and wherein said specified time duration is based on at least one of resources available to said server, a number of connection requests currently being processed by said server, a number of connection requests seen by said server and a number of expected connection requests.

4. Apparatus for use in a communications network interconnecting a plurality of client computers, wherein at least one of the plurality of client computers is a prioritized client computer having an order of priority, the apparatus comprising a server which includes:
a server response module, operative, in response to a connection request from at least one said client computer which connection request cannot be processed by said server, to provide to said at least one client computer a delay notification indicating that said connection request should be retransmitted by said at least one of said plurality of client computers after a specified time duration is allowed to pass, wherein said specified time duration depends on said order of priority.

5. Apparatus according to claim 4 and also comprising a prioritized client identification module operative, upon receipt of a connection request from said prioritized client computer, to identify said connection request as a prioritized connection request, and to employ reserved prioritized client connection resources to connect said prioritized client computer to said server, thereby to add said prioritized client computer to a virtual private network including said server.

6. Apparatus according to claim 4 and wherein said specified time duration is based on at least one of resources available to said server, a number of connection requests currently being processed by said server, a number of connection requests seen by said server and a number of expected connection requests.

7. Apparatus for use in a communications network comprising a server and a plurality of client computers operative to request connection to said server and to be connected to said server when a request for connection is granted and thereby to create a virtual private network, wherein at least one of the plurality of client computers is a prioritized client computer having an order of priority, the apparatus comprising:
means for providing to at least one of said plurality of client computers, in response to a connection request from said at least one of said plurality of client computers which connection request cannot be processed by said server, a delay notification indicating that said connection request should be retransmitted by said at least one of said plurality of client computers after a specified time duration is allowed to pass, wherein said specified time duration depends on said order of priority.

8. Apparatus according to claim 7 and wherein said server includes reserved prioritized client connection resources, the apparatus also including:
   means for identifying a connection request received from said prioritized client computer as a prioritized connection request and for employing said reserved prioritized client connection resources to connect said prioritized client computer to said server thereby to add said prioritized client computer to said virtual private network.

9. Apparatus according to claim 7 and wherein said specified time duration is based on at least one of resources available to said server, a number of connection requests currently being processed by said server, a number of connection requests seen by said server and a number of expected connection requests.

10. A method for connecting multiple client computers to a server thereby to create a virtual private network, the method comprising:
   providing a server forming part of said virtual private network;
   sending a plurality of connection requests from a plurality of client computers to said server, wherein at least one of said plurality of client computers is a prioritized client computer having an order of priority; and
   in response to server failure in processing at least one of said plurality of connection requests received from at least one of said client computers, sending from said server to said at least one of said plurality of client computers a delay notification indicating that said connection request should be retransmitted by said at least one of said client computers after a specified time duration is allowed to pass, wherein said specified time duration depends on said order of priority.

11. A method according to claim 10 and wherein said sending comprises sending a prioritized connection request from said prioritized client computer, the method also comprising:
   providing reserved prioritized client connection resources on said server; and
   in response to receipt of said prioritized connection request, identifying said connection request as a prioritized connection request; and
   employing said reserved prioritized client connection resources to connect said prioritized client computer to said server thereby to add said prioritized client computer to said virtual private network.

12. A method for use in a communications network interconnecting a plurality of client computers and at least one server, wherein at least one of said plurality of client computers is a prioritized client computer having an order of priority, the method comprising:
   providing to at least one said client computer, in response to a connection request from said at least one client computer which connection request cannot be processed by said server, a delay notification indicating that said connection request should be retransmitted by said at least one of said plurality of client computers after a specified time duration is allowed to pass, wherein said specified time duration depends on said order of priority.

13. A method according to claim 12 and also comprising:
   identifying a connection request received from said prioritized client computer as a prioritized connection request; and
   employing reserved prioritized client connection resources to connect said prioritized client computer to said server, thereby to add said prioritized client computer to a virtual private network including said server.

14. A computer software product for use in a communications network comprising a server and a plurality of client computers, wherein at least one of said plurality of client computers is a prioritized client computer having an order of priority and is operative to request connection to said server and to be connected to said server when a request for connection is granted thereby to create a virtual private network, the computer software product comprising a non-transitory computer-readable medium in which program instructions are stored, which instructions, when read by a computer, cause the computer to provide to at least one of said plurality of client computers, in response to a connection request from said at least one of said plurality of client computers which connection request cannot be processed by said server, a delay notification indicating that said connection request should be retransmitted by said at least one of said plurality of client computers after a specified time duration is allowed to pass, wherein said specified time duration depends on said order of priority.

* * * * *